Sept. 7, 1965  G. J. TOOKER  3,204,986
MACHINE FOR AND METHOD OF MAKING BOOK COVERS
Filed Oct. 6, 1961  6 Sheets-Sheet 1
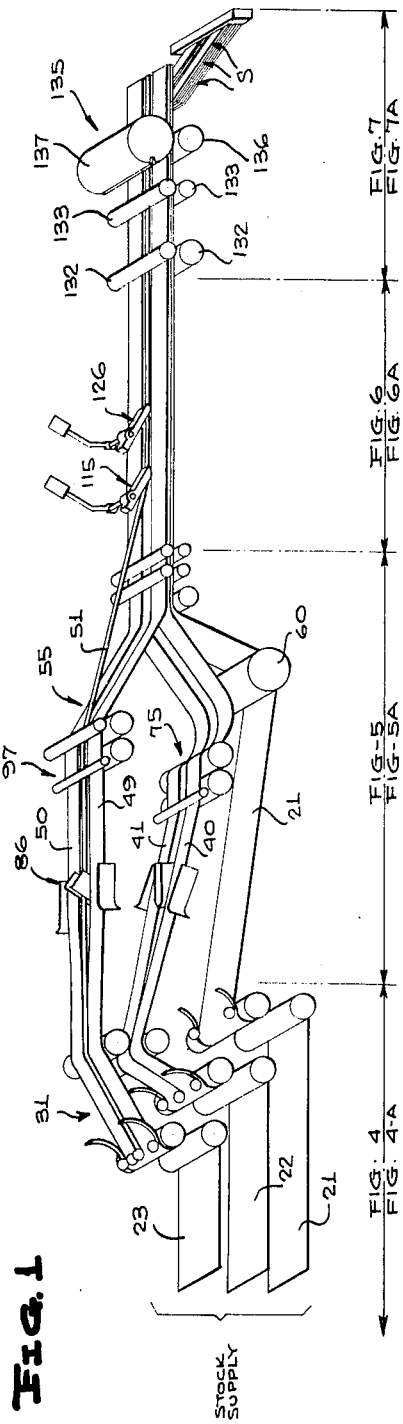
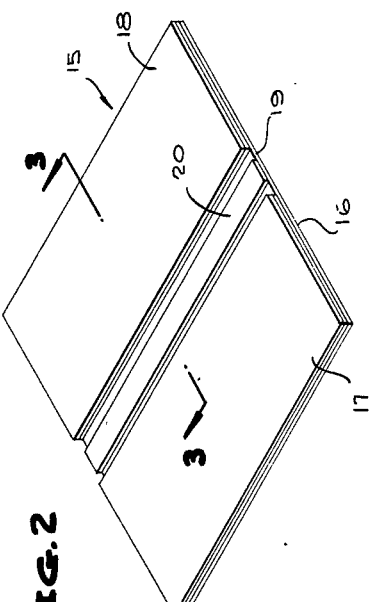
INVENTOR.
GEORGE J. TOOKER
BY
Mason, Porter, Diller & Stewart
ATTORNEYS

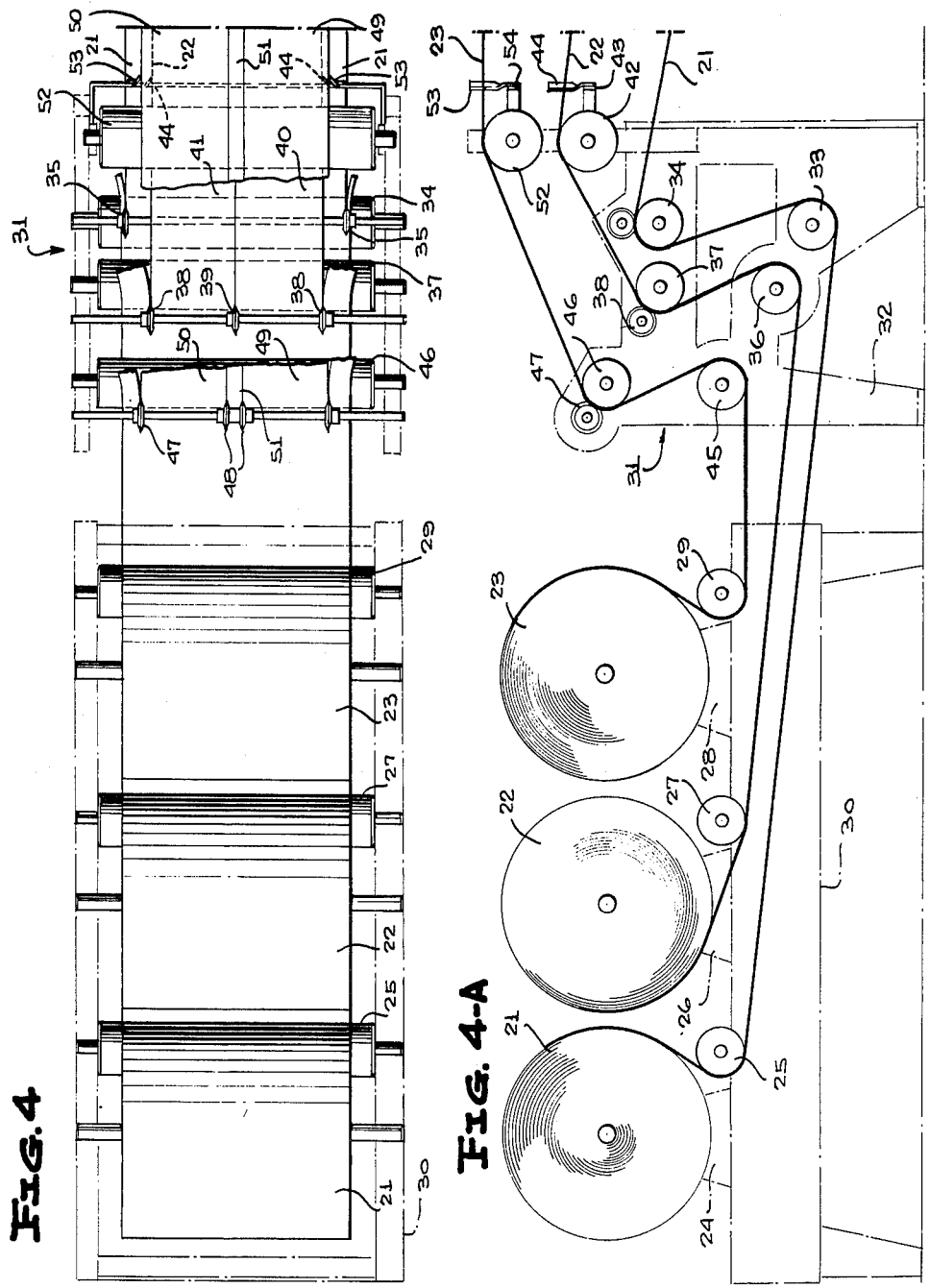

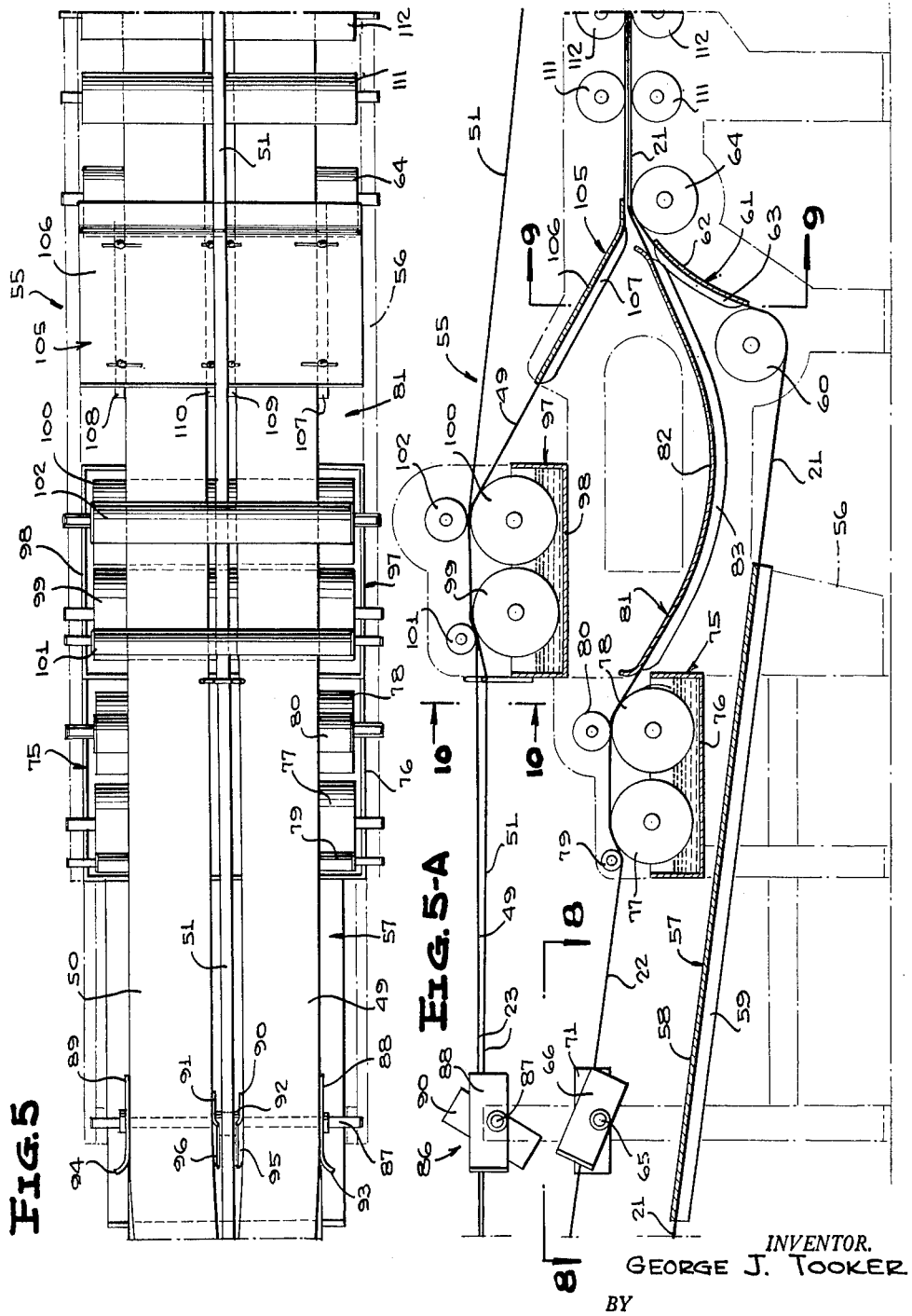

Sept. 7, 1965 G. J. TOOKER 3,204,986
MACHINE FOR AND METHOD OF MAKING BOOK COVERS
Filed Oct. 6, 1961 6 Sheets-Sheet 4
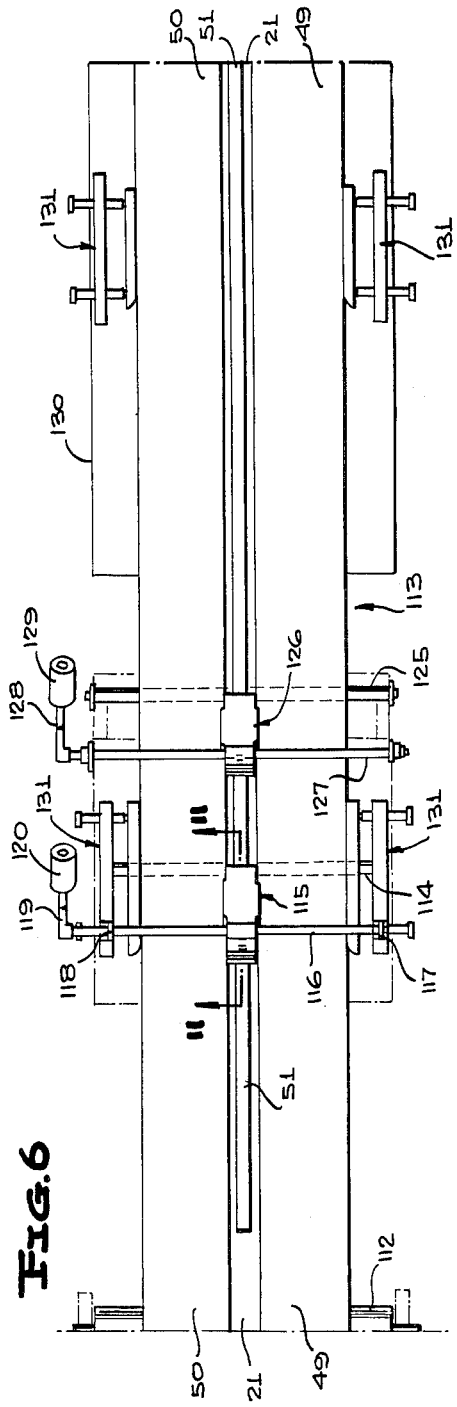
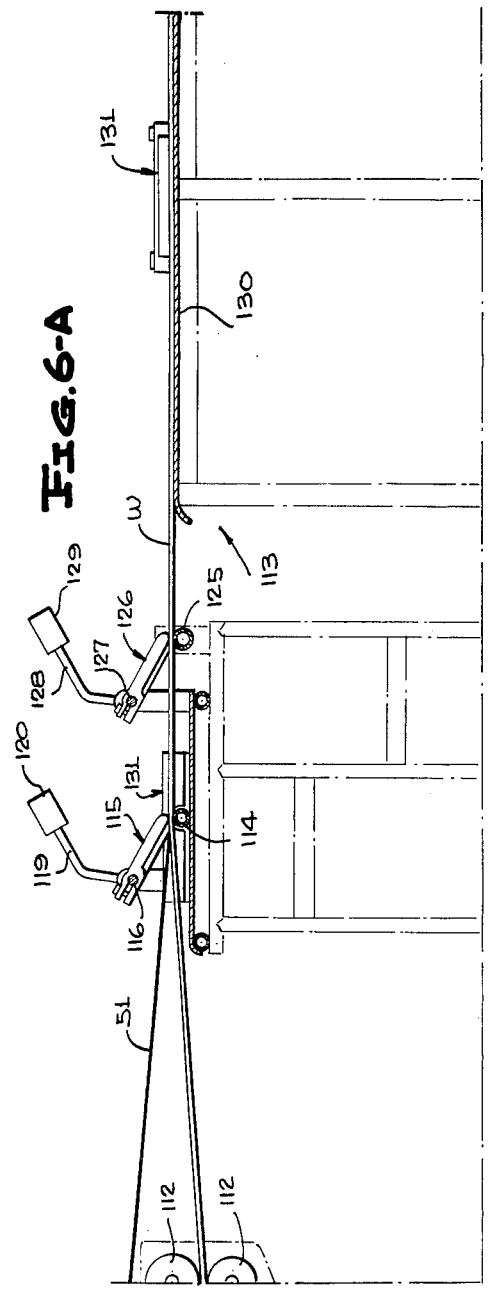
INVENTOR.
GEORGE J. TOOKER
BY
Mason, Porter, Diller & Stewart
ATTORNEYS

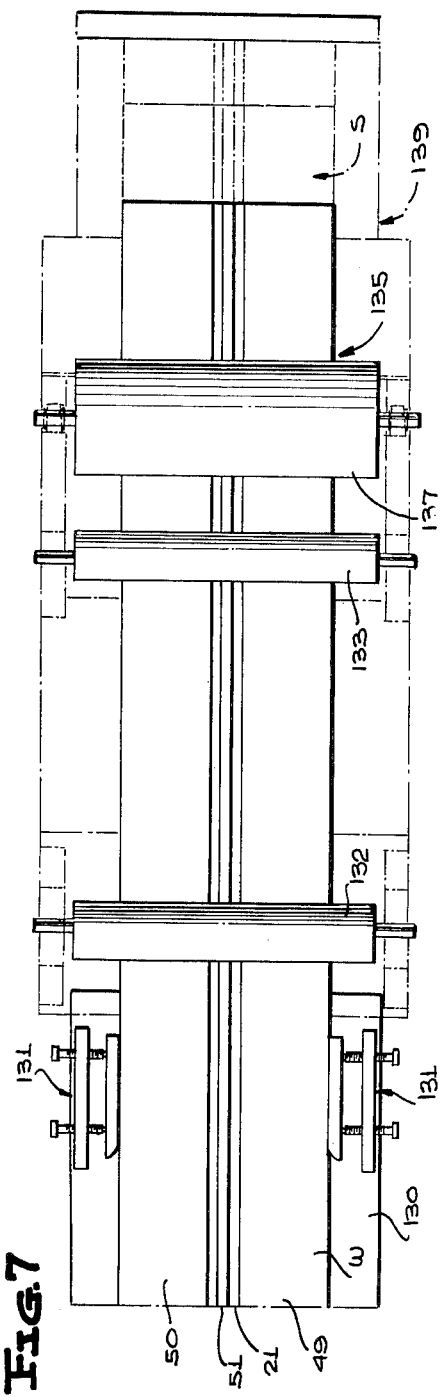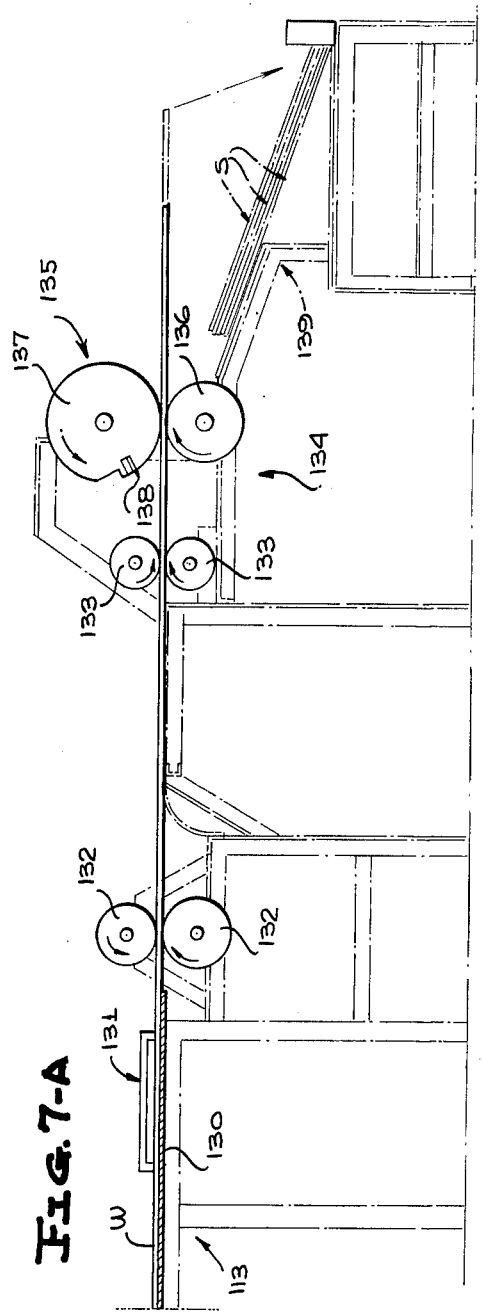

Sept. 7, 1965 G. J. TOOKER 3,204,986
MACHINE FOR AND METHOD OF MAKING BOOK COVERS
Filed Oct. 6, 1961 6 Sheets-Sheet 6
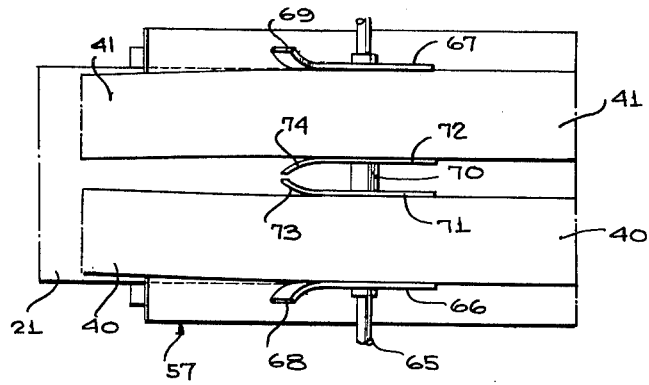
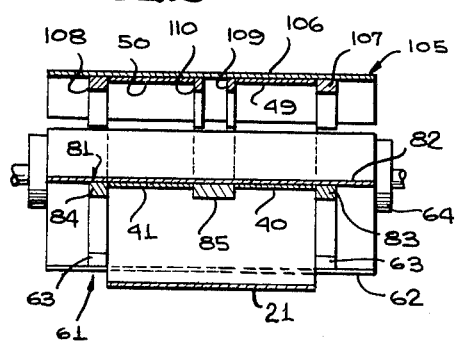
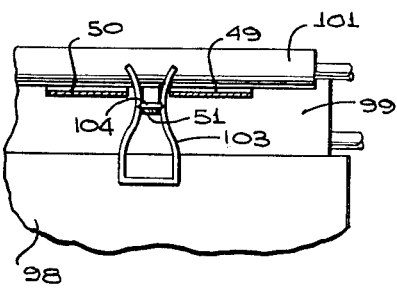
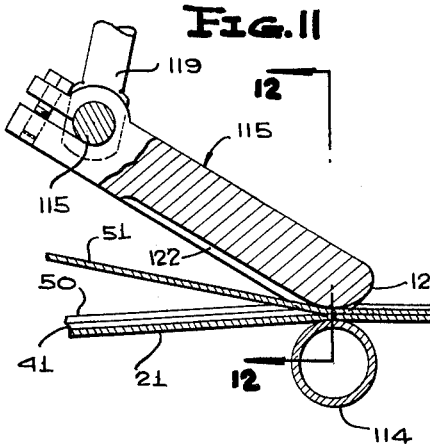
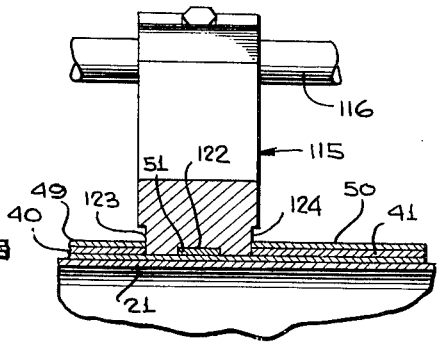
INVENTOR.
GEORGE J. TOOKER
BY
Mason, Porter, Diller & Stewart
ATTORNEYS United States Patent Office 3,204,986
Patented Sept. 7, 1965

3,204,986
MACHINE FOR AND METHOD OF MAKING BOOK COVERS
George J. Tooker, Lynnfield, Mass., assignor to Continental Can Company, Inc., New York, N.Y., a corporation of New York
Original application Oct. 31, 1960, Ser. No. 66,168. Divided and this application Oct. 6, 1961, Ser. No. 143,489
13 Claims. (Cl. 281—29)

This invention relates in general to new and useful improvements in the art of book covers, and more particularly relates to a novel machine for and method of making book covers which are formed of laminated paperboard and which are suitable for use in the relatively inexpensive edition of books.

This application is a division of my co-pending application, Serial No. 66,168, filed October 31, 1960.

A primary object of the invention is to provide a novel method of forming a cover for relatively inexpensive books, the cover being formed initially of a continuous lamination from three separate webs, each of the webs being accurately cut to size and the web portions being accurately aligned during the lamination thereof wherein no further trimming of the laminated structure is required.

Another object of the invention is to provide a novel method of forming book covers wherein three separate webs are provided with the first of the webs being accurately cut to width and forming the cover board of the book cover, the second of the webs being accurately cut to width and split longitudinally into two identical portions, which portions are separated and have their outer edges aligned with the edges of the first web, and a third web which is accurately cut to width and then is further cut to define a central narrow strip and a pair of web portions which correspond to the web portions of the second web and which web portions are moved away from the central strip and have their outer edges aligned with the outer edges of the second web portions and the edges of the first web, the second and third web portions forming laminated leaf boards and the narrow central strip forming a reinforcement for the central hinge portion of the cover board.

A further object of this invention is to provide a novel method of forming a book cover from laminated paperboard, the method including the provision of three separate webs, the first of which defines the cover board of the book cover and the other of the webs being suitably divided to provide laminated leaf boards and a reinforcement for the hinge section of the cover board, the second web being divided into two web portions and the third web being divided into two web portions and a central strip, the web portions of the second and third webs being of the same size and being in overlying aligned relation, and the narrow strip of the third web being disposed in the plane of the second web and secured to the cover board.

Still another object of this invention is to provide a novel method of forming book covers and like articles of paperboard, wherein paperboard webs are split longitudinally and then spread apart to define spaced web portions which may be readily aligned with other webs and web portions, the web portions being spread apart and aligned by means of suitable edge guides.

A still further object of the invention is to provide a novel machine for making paperboard book cover, the machine including suitable stands for supporting three separate webs disposed in roll form, a slitting apparatus for accurately slitting the webs to predetermined widths and for dividing the second web into two portions and the third web into two further portions separated by a central strip, and there being provided suitable means for bonding the webs together in alignment, the bonding means including suitable guides for first spreading apart the second and third web portions and then aligning the outer edges of such web portions with the outer edges of the first web prior to the bonding of the webs together.

With the above, and other objects in view that will hereinafter appear, the nature of the invention will be more clearly understood by reference to the following detailed description, the appended claims, and the several views illustrated in the drawings.

In the drawings:

FIGURE 1 is a schematic perspective view showing the over-all details of the book cover forming operation.

FIGURE 2 is an enlarged perspective view of a book cover formed in accordance with the operation of FIGURE 1.

FIGURE 3 is an enlarged fragmentary transverse vertical sectional view taken along the line 3—3 of FIGURE 2, and shows the specific construction of the book cover.

FIGURE 4 is a plan view of that portion of the book cover making machine indicated in FIGURE 1, the view being on a large scale, and the structural frame of the machine being shown in phantom lines.

FIGURE 4A is a side elevational view of the section of the book cover making machine illustrated in FIGURE 4.

FIGURE 5 is a plan view on a large scale of that section of the book cover making machine indicated in FIGURE 1, and shows generally the details of the means for guiding and bonding together the various webs.

FIGURE 5A is an enlarged side elevational view of that portion of the machine illustrated in FIGURE 5.

FIGURE 6 is an enlarged plan view of another intermediate portion of the book cover making machine and corresponds to that portion of the machine indicated in FIGURE 1, the view showing the means for applying the central strip to the first web between the second and third webs which have been previously adhered to the first web.

FIGURE 6A is an enlarged side elevational view of that portion of the book cover making machine indicated in FIGURE 6.

FIGURE 7 is a plan view on an enlarged scale of the terminal portion of the book cover making machine and shows that portion of the machine indicated by reference to FIGURE 7 in FIGURE 1.

FIGURE 7A is an enlarged side elevational view of that portion of the book cover making machine illustrated in FIGURE 7.

FIGURE 8 is an enlarged fragmentary horizontal sectional view showing the specific details of the guide means for separating and guiding the two portions of the second web.

FIGURE 9 is an enlarged fragmentary vertical sectional view taken along the line 9—9 of FIGURE 5A, and shows the specific means for guiding the three webs into alignment with each other prior to the bonding thereof together.

FIGURE 10 is an enlarged fragmentary vertical sectional view taken along the line 10—10 of FIGURE 5A, and shows the manner in which the third web portions and the central strip formed from the third web are guided prior to their entry into an adhesive applicator.

FIGURE 11 is an enlarged fragmentary vertical sectional view taken along the line 11—11 of FIGURE 6, and shows the manner in which a special presser head is used to apply the central strip of the third web to the first web intermediate the second and third web portions.

FIGURE 12 is an enlarged fragmentary transverse vertical sectional view taken along the line 12—12 of FIGURE 11, and shows further the specific details of the presser head.

Reference is now made to the drawings in detail, wherein there is best illustrated in FIGURES 2 and 3 a book cover formed in accordance with this invention, the book cover being generally referred to by the numeral 15. The book cover 15 includes a cover board 16 having secured thereto laminated leaf boards 17, 18 with the portion of the cover board 16 between the leaf boards 17, 18 being in the form of a hinge section 19. The hinge section 19 is reinforced by a narrow strip 20. It is to be noted that each of the leaf boards 17, 18 is formed of two laminations which are of the same size.

In accordance with this invention, it is proposed to form the book cover 15 from a continuous lamination which, in turn, is formed from three separate webs. These webs are provided in roll form to permit the continuous operation of the machine for laminating the webs as the initial step in the formation of the book cover 15. These webs include a first web 21, a second web 22 and a third web 23. In accordance with the invention, the web 21 will be used in the forming of the cover board 16, the web 22 will be divided to form the lower laminations of the leaf boards 17, 18, and the web 23 will be divided to form the upper laminations of the leaf boards 17, 18 and the central strip 20.

A suitable support stand 24 is provided for the roll of the web 21. The support stand 24 may be of any conventional type and, if desired, may be provided with means for transversely adjusting the position of the roll of the web 21. The web 21 is payed off of its respective roll in a clockwise direction and passes beneath a guide roller 25.

The web roll delivering the web 22 is also mounted on a suitable stand, generally referred to by the numeral 26. The stand 26 will be identical to the stand 24, although the web 23 is payed out of its roll in a counterclockwise direction. The web 22 passes beneath a guide roller 27 and is disposed in generally aligned overlying relation to the web 21.

The roll from which the web 23 is fed is mounted on another suitable stand 28. The web 23 is payed out from its roll in a clockwise direction and passes beneath a roller 29 in generally aligned overlying relation to the webs 21 and 22. The stands 24, 26 and 28 may be mounted on a suitable support, such as the support 30, or may be mounted directly on a base, such as the floor of a building.

The three webs 21, 22 and 23 first pass into a slitting apparatus, generally referred to by the numeral 31. The slitting apparatus 31 includes a suitable frame 32 which, for purposes of clarity, is shown in phantom lines.

The slitting apparatus 31 includes a lower guide roller 33 under which the web 21 passes. The web 21 then extends upwardly and slightly rearwardly to and around another roller 34. The roller 34 is in the form of a backup roll for a pair of slitters 35 which are of the circular knife type. The slitters 35, as is best shown in FIGURE 4A, are in the form of edge trimmers and are used for the purpose of trimming the web 21 to a predetermined width.

The slitting apparatus 31 includes another lower roller 36 under which the second web 22 passes. The web 22 passes upwardly from the roller 26 and over and around a roller 37, which roller 37 is in the form of a back-up roll for a plurality of slitters 38 which are in the form of rotary knives. As is best illustrated in FIGURE 4, the slitters 38 are for the purpose of trimming the edges of the second web 22 to a predetermined width which is less than the width of the first web 21. A centrally located slitter 39 also cooperates with the roller 37 to longitudinally slit the trimmed web 22 into two halves which are in the form of two second web portions 40, 41. The second web 22, after being trimmed and split by the slitters 38, 39, passes up and over a roller 42. A suitable support bar 43 is carried by the frame 32 to the right of the roller 42. The support frame 43 carries a pair of upstanding strips 44 which engage the outer edges of the web 22 and remove dust therefrom.

The slitting apparatus 31 includes a further lower guide roller 45 about which the third web 23 passes. The web 23 then is guided upwardly and around a roller 46 which functions as a back-up roll for a pair of slitters 47, the slitters 47 being in the form of edge trimmers for trimming the third web 23 to the desired width. A pair of spaced apart central slitters 48 also cooperates with the roller 46 to longitudinally slit the trimmed web 23 to define two outer third web portions 49, 50 and a narrow central strip 51.

The trimmed and split web 22 passes over an upper roller 52 in its movement from the slitting apparatus 31. After the web 22 passes over the roller 52, the outermost edges thereof are engaged by upwardly directed twisted strips 53 which remove dust from the edges of the web 22. The strips 53 are carried by a suitable support frame 54 which, in turn, is secured to and supported by the frame 32 of the slitting apparatus 31.

At this time, it is pointed out that the trimmed width of the second web 22 is less than that of the first web 21. Also, the trimmed width of the third web 23 is less than that of the first web 21, but greater than that of the second web 22. The web portions 49 and 50 correspond in width to the web portions 40 and 41 and the difference in widths of the webs 22 and 23 is equal to the width of the central strip 51.

The trimmed and split webs next pass to a bonding apparatus generally referred to by the numeral 55. The bonding apparatus 55 is best illustrated in FIGURES 5 and 5A, and includes a suitable frame 56 which is illustrated in phantom lines in order that the specific details of the apparatus acting upon the webs may be clearly seen.

The web 21 enters into a lower guide 57 disposed at the left lower part of the frame 56. The guide 57 includes an upper plate portion 58 and a pair of depending edge guide bars 59. The web 21 passes beneath the plate 58 with the edges thereof in guided engagement with the guide bars 59. The guide 57 thus effects the initial alignment of the web 21 as it passes into the first part of the bonding apparatus 55.

The web 21 passes from the guide 57 around a lower roller 60 and then up over a curved guide, generally referred to by the numeral 61. The guide 61 includes a lower plate 62 and a pair of upper edge guide bars 63. Thus, guidance of the web 21 is maintained as it passes through the guide 61 and up over a roller 64.

As the second web 22 passes over the roller 42 of the slitting apparatus 31, the second web portions 40, 41 begin to diverge in order that the web portions may be spaced as is necessary in the forming of the book cover 15. The divergence of the second web portions 40, 41 is brought about by a plurality of guide plates which are mounted on a transverse shaft 65 which overlies the left hand portion of the guide 57. As is best illustrated in FIGURE 8, the guide plates carried by the shaft 65 include a pair of outer guide plates 66, 67 having outwardly curved forward edges 68, 69, respectively, which engage the outer edges of the second web portions 41 and limit the outward movement of the second web portions 40, 41 relative to each other. On the other hand, the second web portions 40, 41 are spread apart by a central guide plate assembly which is formed of a hub 70 having a pair of guide plates 71, 72 rigidly secured thereto. The guide plates 71, 72 have inwardly curved forward edge portions 73, 74, respectively. The guide plate 71 engages the inner edge of the second web portion 40, and the guide plate 72 engages the inner edge of the second web portion 41 to urge the second web portions 40, 41 apart a distance equal to the difference in initial widths between the trimmed web 21 and the trimmed web 22. Thus, when properly guided, the outer edges of the second web portions 40, 41 are aligned with the edges of the web 21.

After the second web portions 40, 41 are spaced apart, the second web 22 passes through an adhesive applicator, generally referred to by the numeral 75 and best illustrated in FIGURE 5A. The adhesive applicator 75 includes an adhesive pan 76 in which a pair of adhesive applying rolls 77, 78 are mounted. A guide roller 79 is disposed slightly in advance of the roller 77 to assure the engagement of the web 22 with the roller 77. A second hold-down roller 80 overlies the roller 77 and assures engagement of the second web 22 with the roller 78. Thus, application of a suitable adhesive to the underside of the web 22 throughout the width thereof is assured.

After passing through the adhesive applicator 75, the web 22 passes around and beneath a guide, generally referred to by the numeral 81. The guide 81 includes a curved upper plate 82 having suitable edge guide bars secured to the underside thereof. As is best illustrated in FIGURE 9, the edge guide bars include outer edge guide bars 83, 84 which engage the outer edges of the second web portions 40, 41, respectively. The edge guide bars also include an edge guide bar 85 which is centrally located and which is of a width equal to the spacing of the second web portions 40, 41 so as to engage the inner edges of the second web portions 40, 41 and assure rigid guidance of these web portions. As the web portions 40, 41 of the second web 22 exit from the guide 81, they immediately pass over the roller 64 in overlying relation to the first web 21 with the outer edges of the second web portions 40, 41 being aligned with the edges of the first web 21.

As the third web 23 passes over the roller 52 of the slitting apparatus 31, the central strip 51 continues to move in a straight line, and the third web portions 49, 50 begin to diverge. This divergence or spreading apart of the web portions 49, 50 is brought about by a guide assembly, generally referred to by the numeral 86, and being disposed in overlying relation to the guide assembly for the web 22. The guide assembly 86, as is best shown in FIGURES 5 and 5A, includes a transverse support shaft 87 on which a pair of outer edge guide plates 88, 89 are mounted, the guide plates 88, 89 engaging outer edges of the third web portions 49, 50, respectively. The guide units 86 also include a pair of inner edge guide plates 90, 91 which are mounted on a central hub 92 carried by the shaft 87. The edge guide plates 90, 91 are disposed on opposite sides of the central strip 51 and engage the inner edges of the web portions 49, 50, respectively. It is to be noted that the edge guide plates 88, 89 are provided at their forward ends with outwardly directed curved portions 93, 94, respectively, whereas the guide plates 90, 91 are provided at their forward ends with inwardly curved portions 95, 96, respectively. As the third web portions 49, 50 engage the guide plates 88, 89, 90 and 91, they are spread apart to the desired spacing. The central strip 51 passes over the hub 92.

The third web 23 passes from the guide unit 86 to an adhesive applicator, generally referred to by the numeral 97. The adhesive applicator 97 includes an adhesive pan 98 in which a pair of adhesive applying rollers 99, 100 rotate. A forward roller 101 overlies the roller 99 and urges the portions of the web 23 into engagement with the roller 99. Another roller 102 overlies the roller 100 and urges the portions of the web 23 into engagement with the roller 100. Thus, adhesive is applied to the undersides of all portions of the web 23.

Reference is now made to FIGURE 10 in particular, wherein it will be seen that the forward wall of the adhesive pan 98 is provided with a suitable guide structure which includes an upstanding yokelike member 103 having a cross-bar 104 extending between an upper closely spaced portion. The central strip 51 passes beneath the cross-bar 104 and is edge guided by the yoke 103.

After the web 23 passes over the roller 100, the web portions 49, 50 extend down and beneath a guide, generally referred to by the numeral 105. The guide 105, as is best illustrated in FIGURE 9, includes an upper guide plate 106 which has secured to the underside thereof outer edge guide bars 107, 108 which engage the outer edges of the web portions 49, 50, respectively, as the web portions pass beneath the plate 106. A pair of closely spaced inner edge guide bars 109, 110 are secured to the central portion of the plate 106 on the underside thereof and guidingly engage the inner edges of the web portions 49, 50, respectively. It is to be noted that the guide 105 guides the web portions 49, 50 into engagement with the web portions 40, 41, respectively, in overlying relation to the roller 64. At the same time, the central strip 51 continues in an elevated position.

The web 21, the web portions 40, 41 and the web portions 49, 50, respectively, are properly aligned when they engage with each other over the roller 64. These web portions then pass between a pair of pressure rollers 111 between which the web portions 40, 41 are urged into engagement with the web 21 and the web portions 49, 50 are urged into engagement with the web portions 40, 41, respectively. The web and web portions pass through a second set of pressure rollers 112 which further urge the web and web portions into contact with each other.

After the laminated webs pass between the pressure rollers 112, they pass onto a suitable guide structure, generally referred to by the numeral 113. Overlying the guide structure 113 is a transverse tubular member 114 which cooperates with a presser head, generally referred to by the numeral 115, to bring the central strip 51 into contact with the first web 21. The presser head 115 is carried by a transverse shaft 116 which is journaled, as at 117 and 118, for pivotal movement. The shaft 116 has an offset arm 119 on which there is mounted a weight 120, the weight 120 bringing the presser head 115 into pressure contact with the central strip 51.

Reference is now made to FIGURES 11 and 12, wherein it is shown that the presser head 115 has a rounded nose 121 at the rear end thereof directly overlying the tubular member 114 and cooperating therewith to pressure urge the central strip 51 into engagement with the web 21. The underside of the presser head 115 is provided with a central recess 122 for the reception of the central web 51, as is best shown in FIGURE 12. Also, the lower forward portion of the presser head 115 is of a reduced width to provide side guide portions 123, 124 which engage the inner edges of the web portions 40, 49 and 41, 50, respectively. Thus, the presser head 115 serves to both bring the central strip 51 into initial pressure contact with the web 21 and to guide the laminated portions of the webs.

A second tubular member 125 is spaced longitudinally of the tubular member 114. A second presser head, generally referred to by the numeral 126, cooperates with the tubular member 125 in the same manner as that described above with respect to the presser head 115. The presser head 126 is carried by a transverse shaft 127 which is suitably mounted for pivoting and which has an offset arm 128 at one end with a weight 129 thereon normally urging the presser head 126 into pressure contact with the central strip 51 and thereby bringing about the desired lamination thereof to the web 21.

The support structure 113 includes an elongated guide plate 130 on which the laminated web, generally referred to by the letter W, slides. The support structure 113 also includes suitable adjustable edge guides, generally referred to by the numeral 131 and best illustrated in FIGURE 6. It is to be understood that the support sheet 130 will be quite long so as to provide sufficient drying time for the adhesive.

Reference is now made to FIGURES 7 and 7A, wherein it is shown that at the end of the guide sheet 130 there are provided suitable feed rolls 132. The feed rolls 132 serve to draw the laminated web through the machine and serve as the feed means for the laminated web as it passes along the support sheet 130. The laminated web W also passes between another pair of feed rolls 133 which are part of a cutting mechanism, generally referred to by the numeral 134 for cutting the laminated web W into readily handlable lengths. The cutting mechanism 134 also includes a conventional sheeter, generally referred to by the numeral 135. The sheeter 135 includes a lower back-up roll 136 and an upper cutter roll 137 which carries a cutter blade 138. As the laminated web passes through the cutting apparatus 135, it is cut into sheets of predetermined lengths and generally referred to by the letter S. The sheets S fall into a suitable support 139 where they may be readily gathered and stacked for bailing. Although the lengths of the sheets may be equal to the desired length of a book cover 15, it is to be understood that the lengths of the sheets S will be equal to multiples of the lengths of the book cover 15 plus sufficient waste so as to permit a plurality of book covers to be formed from a single sheet S.

At this time, attention is directed to the fact that since the web 22 is unreeled in opposite direction from the webs 21 and 23, and curvature of the web 22 counterbalances the curvature of the webs 21 and 23, and thus the laminated web W has a tendency to be flat, as opposed to being curved, if all of the webs 21, 22 and 23 were unreeled in the same direction.

It is also pointed out at this time that the guidance structure of the machine will accurately guide the edges of the web portions so as to align them with the edges of the web 21. Thus, no edge slitting is necessary after the laminated web W has been formed. This guidance is highly desirable in that if the outer edges of the web portions 40, 41, 49 and 50 are properly guided, then the inner edges of these webs will be also aligned and the spacing between the two will be maintained.

From the foregoing, it will be seen that novel and advantageous provision has been made for carrying out the desired end. However, attention is directed to the fact that variations may be made in the example form of the invention disclosed herein without departing from the spirit and scope of the invention, as defined in the appended claims.

I claim:

1. In the method of forming book covers, the steps of providing a first web of predetermined width, providing a second web of a predetermined lesser width than the first web, longitudinally splitting the second web into two outer portions and a narrow central strip, spreading apart the two second web portions on opposite sides of the strip and aligning outer edges of the second web portions with edges of the first web, and securing the second web portions and the strip to the first web, with the portion of the first web intermediate the two second web portions a hinge section and the strip overlying and reinforcing the hinge section.

2. In the method of forming book covers, the steps of providing a first web of predetermined width, providing a second web of a predetermined lesser width than the first web, longitudinally splitting the second web into two outer portions and a narrow central strip, spreading apart the two second web portions and aligning outer edges of the second web portions with edges of the first web, securing the second web portions to the first web with the portion of the first web intermediate the two second web portions defining a hinge section, and then securing the strip to the first web hinge section.

3. In the method of forming book covers, the steps of providing a first web of predetermined width, providing a second web of a predetermined lesser width than the first web, longitudinally splitting the second web into two portions, spreading apart the two second web portions and aligning outer edges of the second web portions with edges of the first web, securing the second web portions to the first web with the portion of said first web intermediate the two second web portions defining a hinge structure, providing a third web of a predetermined greater width than the second web and lesser width than the first web, longitudinally splitting the third web into a central strip and outer portions, spreading apart the third web portions on opposite sides of the strip and aligning outer edges of the third web portions with the outer edges of the second web portions and edges of the first web, and securing the third web portions to the second web portions and the strip to the first web hinge section.

4. The method of claim 3 wherein the second web portions are secured to the first web simultaneously with the securing of the third web portions to the second web portions and thereafter the strip is secured to the first web.

5. In the method of forming book covers, the steps of providing a first web and trimming the first web to a predetermined width, providing a second web and simultaneously trimming the second web to a predetermined lesser width than the first web and longitudinally splitting the second web into two portions, spreading apart the two second web portions and aligning outer edges of the second web portions with edges of the first web, securing the second web portions to the first web with the portion of the first web intermediate the two second web portions defining a hinge section, providing a third web and simultaneously trimming the third web to a predetermined width less than the width of the first web and greater than the width of the second web and longitudinally splitting the third web into a central strip and outer portions, spreading apart the third web portions on opposite sides of the strip and aligning outer edges of the third web portions with the outer edges of the second web portions and edges of the first web, and securing the third web portions to the second web portions and the strip to the first web hinge section.

6. The method of claim 5 wherein the second web portions are secured to the first web simultaneously with the securing of the third web portions to the second web portions and thereafter the strip is secured to the first web.

7. A machine for making book covers comprising stands for first, second and third webs disposed in roll form; a web slitting apparatus disposed adjacent said stands for receiving webs therefrom, said web slitting apparatus including slitters for trimming each web to a predetermined width and other slitters for splitting the second web into two portions and the third web into two outer portions and a central strip; and a bonding apparatus for receiving the webs and securing the same together, the bonding apparatus including guide means for spreading apart the second and third web portions and aligning outer edges thereof with the edges of the first web, means for applying adhesive to certain areas of the webs, and means for effecting pressure engagement of the webs to effect the bonding together of the webs to form a continuous web from which book cover lengths may be cut.

8. A machine for making book covers comprising stands for first, second and third webs disposed in roll form; a web slitting apparatus disposed adjacent said stands for receiving webs therefrom, said web slitting apparatus including slitters for trimming each web to a predetermined width and other slitters for splitting the second web into two portions and the third web into two outer portions and a central strip; and a bonding apparatus for receiving the webs and securing the same together, the bonding appartus including guide means for spreading apart the second and third web portions and aligning outer edges thereof with the edges of the first web, means for applying adhesive to certain areas of the webs, and means for effecting pressure engagement of the webs to effect the bonding together of the webs to form a continuous web from which book cover lengths may be cut, said guide means for spreading apart the second and third web portions being in the form of guide members spaced in the direction of movement of the second and third webs from said web slitting apparatus and engageable with inner edges of the second and third web portions to force the portions of the second and third webs apart in diverging relation from said web slitting apparatus.

9. A machine for making book covers comprising stands for first, second and third webs disposed in roll form; a web slitting apparatus disposed adjacent said stands for receiving webs therefrom, said web slitting apparatus including slitters for trimming each web to a predetermined width and other slitters for splitting the second web into two portions and the third web into two outer portions and a central strip; and a bonding apparatus for receiving the webs and securing the same together, the bonding apparatus including guide means for spreading apart the second and third web portions and aligning outer edges thereof with the edges of the first web, means for applying adhesive to certain areas of the webs, and means for effecting pressure engagement of the webs to effect the bonding together of the webs to form a continuous web from which book cover lengths may be cut, said guide means being formed into two parts, the first part being for effecting the aforesaid spreading apart of the second and third web portions and the second part being for effecting the aforesaid aligning of the outer edges of the second and third web portions with the edges of the first web; said guide means parts being longitudinally spaced and said adhesive applying means being disposed intermediate said guide means parts.

10. A machine for making book covers comprising stands for first, second and third webs disposed in roll form; a web slitting apparatus disposed adjacent said stands for receiving webs therefrom, said web slitting apparatus including slitters for trimming each web to a predetermined width and other slitters for splitting the second web into two portions and the third web into two outer portions and a central strip; and a bonding apparatus for receiving the webs and securing the same together, the bonding apparatus including guide means for spreading apart the second and third web portions and aligning outer edges thereof with the edges of the first web, means for applying adhesive to certain areas of the webs, and means for effecting pressure engagement of the webs to effect the bonding together of the webs to form a continuous web from which book cover lengths may be cut, the means for effecting pressure engagement of the webs including first pressure applying means for urging the second web portions into contact with the first web, and the third web portions into contact with the second web portions, and second pressure applying means for urging the third web central strip into contact with the first web.

11. The machine of claim 10 wherein said second pressure applying means is separate from said first pressure applying means and spaced longitudinally therefrom.

12. The machine of claim 10 wherein said second pressure applying means is in the form of a presser head having a nose portion for engaging and forcing the third web central strip into contact with the first web and side guide surfaces for guiding engagement with inner edges of the second and third web portions.

13. A machine for making book covers comprising stands for first, second and third webs disposed in roll form; a web slitting apparatus disposed adjacent said stands for receiving webs therefrom, said web slitting apparatus including slitters for trimming each web to a predetermined width and other slitters for splitting the second web into two portions and the third web into two outer portions and a central strip; and a bonding apparatus for receiving the webs and securing the same together, the bonding apparatus including guide means for spreading apart the second and third web portions and aligning outer edges thereof with the edges of the first web, means for applying adhesive to certain areas of the webs, and means for effecting pressure engagement of the webs to effect the bonding together of the webs to form a continuous web from which book cover lengths may be cut, the guide means for aligning the second and third web portions with the first web including a guide plate for each web and web edge engaging guide bars secured to each guide plate.

References Cited by the Examiner
UNITED STATES PATENTS

| | | | |
|---|---|---|---|
| 1,908,109 | 5/33 | Bolton | 281—36 |
| 2,250,533 | 7/41 | Hanson | 156—259 |
| 2,641,484 | 6/53 | Brody | 11—2 X |
| 2,922,172 | 1/60 | Boyle | 11—2 X |
| 2,977,271 | 3/61 | Lutwork | 156—554 X |

JEROME SCHNALL, *Primary Examiner.*

JOSEPH D. BEIN, LAWRENCE CHARLES,
*Examiners.*